United States Patent
Bour et al.

(10) Patent No.: US 7,177,061 B2
(45) Date of Patent: Feb. 13, 2007

(54) SEMICONDUCTOR OPTICAL MODULATOR HAVING A QUANTUM WELL STRUCTURE FOR INCREASING EFFECTIVE PHOTOCURRENT GENERATING CAPABILITY

(75) Inventors: David P. Bour, Cupertino, CA (US); Jintian Zhu, Palo Alto, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/141,100

(22) Filed: May 31, 2005

(65) Prior Publication Data

US 2006/0269183 A1    Nov. 30, 2006

(51) Int. Cl.
   G02F 1/00    (2006.01)
   G02F 1/03    (2006.01)
   H01S 5/00    (2006.01)
   H01S 3/08    (2006.01)
   H01L 29/06   (2006.01)

(52) U.S. Cl. .............. 359/237; 359/240; 359/241; 359/245; 359/248; 359/321; 372/45.01; 372/45.012; 372/50.1; 372/96; 257/14; 257/17; 257/18; 257/96

(58) Field of Classification Search ........... 359/237, 359/240, 241, 243–245, 248, 321; 372/45.01, 372/45.012, 50.1, 96; 257/13–15, 17–19, 257/21, 39, 79, 80, 96, 97, 184, 185, 189, 257/474, 773; 204/192.3, 192.32; 428/118
See application file for complete search history.

(56) References Cited

U.S. PATENT DOCUMENTS

| 4,839,899 A | * | 6/1989 | Burnham et al. | ........ 372/45.01 |
| 4,882,734 A | * | 11/1989 | Scifres et al. | ........ 372/45.012 |
| 5,008,717 A | * | 4/1991 | Bar-Joseph et al. | ........ 359/321 |
| 5,034,783 A | * | 7/1991 | Chang et al. | ........ 257/14 |
| 5,073,805 A | * | 12/1991 | Nomura et al. | ........ 257/96 |
| 5,170,407 A | * | 12/1992 | Schubert et al. | ........ 372/96 |
| 5,229,878 A | * | 7/1993 | Tomita et al. | ........ 359/248 |
| 5,287,377 A | * | 2/1994 | Fukuzawa et al. | ........ 372/45.01 |
| 5,521,397 A | * | 5/1996 | Zhang | ........ 257/17 |
| 5,604,356 A | * | 2/1997 | Shiraishi | ........ 257/17 |
| 5,841,151 A | * | 11/1998 | Sahara | ........ 257/14 |
| 5,953,479 A |   | 9/1999 | Zhou et al. | |

FOREIGN PATENT DOCUMENTS

| EP | 0 726 483 A2 | 8/1996 |
| WO | WO 02/061499 A1 | 8/2002 |

OTHER PUBLICATIONS

Search report from corresponding application number EP 06 01 0549.
"Quantum-Confined Stark Effect in Graded-Gap Quantum Wells" Journal of Applied of Physics, American Institute of Physics. New York, US, vol. 62, No. 8, Oct. 15, 1987 (Oct. 15, 1987), pp. 3360-3365, XP000676251 ISSN: 0021-8979.

* cited by examiner

Primary Examiner—Loha Ben (57) ABSTRACT

An optical modulator comprises a first waveguide layer and a barrier layer, and a quantum well layer sandwiched between the first waveguide layer and the barrier layer, where the quantum well layer has a graded composition that varies the bandgap energy of the quantum well layer between a minimum bandgap energy and the bandgap energy of at least one of the first waveguide layer and the barrier layer.

22 Claims, 7 Drawing Sheets

SEMICONDUCTOR OPTICAL MODULATOR HAVING A QUANTUM WELL STRUCTURE FOR INCREASING EFFECTIVE PHOTOCURRENT GENERATING CAPABILITY

BACKGROUND OF THE INVENTION

Semiconductor-based optical modulators have been developed using many different technologies and are used for modulating light for optical communications. One such semiconductor-based optical modulator is referred to as an electro-absorption modulator. In one example, a semiconductor electro-absorption optical modulator is used to modulate light in the 1550 nanometer (nm) wavelength for use in a long range fiber-optic communication system. A typical semiconductor electro-absorption optical modulator is fabricated using wafer processing technology. The optical modulator is typically reverse biased by an external electrical circuit so that when an input light source is coupled into the optical modulator, the input light is converted by one or more quantum wells in the optical modulator into a photocurrent. The wavelength of light at which the quantum wells in the optical modulator absorb photons and convert the photons to a photocurrent is dependent upon the material used to fabricate the layers of the optical modulator and the electrical bias applied to the optical modulator. The wavelength of light at which the quantum wells in the optical modulator absorb photons and convert the photons to a photocurrent can also be influenced by exploiting what is referred to as the Quantum Confined Stark Effect. The Quantum Confined Stark Effect is a phenomenon that allows the ground state subband energy separation of the material used to form the quantum well of the modulator to be reduced using a reverse electrical bias applied to the optical modulator. The reduction of the subband energy creates what is referred to as a "field effect" optical modulator. By employing the Quantum Confined Stark Effect, the speed at which an optical modulator can operate greatly exceeds the speed at which a conventional directly-modulated semiconductor laser can transmit data.

Generally, the bandgap of the material used to form the quantum well layer is lower than the bandgap of the material used to form the barrier layers that sandwich each quantum well layer. When the optical modulator is appropriately electrically biased, input light directed toward the quantum well is absorbed to generate electrical charge carriers, i.e., electrons in the conduction band and holes in the valence band, in the quantum well. The electron-hole pairs are then extracted from the quantum well to develop a photocurrent. The material used to form the quantum well layer and the electrical bias applied to the optical modulator greatly influences the absorption coefficient of the quantum well in the optical modulator. The absorption coefficient is a measure of the ability of the quantum well to absorb light and generate electron-hole pairs.

The material used to form the quantum well and the material used to form the barrier layers greatly influences the ability of the quantum well layer to release the photogenerated electron-hole pairs to generate the photocurrent. For example, a high energy barrier at the junction of the quantum well layer and the barrier layer provides a well-defined quantum state that exhibits a high absorption coefficient. However, a high energy barrier at the junction of the quantum well layer and the barrier layer also makes it difficult to extract the electron-hole pairs and generate a large photocurrent. If the photogenerated carriers are not efficiently extracted, an internal e-field will be created causing the response of the optical modulator to be slowed and causing the absorption characteristic to saturate with respect to incident power.

Therefore, it is desirable to provide an optical modulator that exhibits a high absorption coefficient and that generates a large photocurrent, while minimizing saturation and maintaining fast response at high optical power.

SUMMARY OF THE INVENTION

In one embodiment, the invention provides an optical modulator, comprising a first waveguide layer, a barrier layer, and a quantum well layer sandwiched between the first waveguide layer and the barrier layer, where the quantum well layer has a graded composition that varies the bandgap energy of the quantum well layer between a minimum bandgap energy and the bandgap energy of at least one of the first waveguide layer and the barrier layer.

The invention also provides a method for generating a photocurrent comprising providing a quantum well structure having at least one element that forms a graded composition within the quantum well structure, the graded composition varying the bandgap energy of the quantum well structure, directing light onto the quantum well structure, converting the light into electron-hole pairs in the quantum well, and extracting the electron-hole pairs from the quantum well to generate a photocurrent.

The semiconductor optical modulator having a quantum well structure for increasing effective photocurrent generating capability substantially aligns the peaks of the wave functions of the electrons in the conduction band and the holes in the valence bands, respectively, in the quantum well. In one embodiment, the quantum well structure is formed with a quantum well layer that has a graded bandgap energy profile. In another embodiment, the quantum well structure is formed with an additional layer of material having a graded composition located adjacent the quantum well layer. The alignment of the electron and hole wave functions increases the absorption coefficient of the quantum well. The quantum well structure provides a high energy barrier at the interface of the quantum well and the barrier layer, while allowing efficient extraction of the photogenerated carriers to provide a large photocurrent.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

The semiconductor optical modulator having a quantum well structure for increasing photocurrent generating capability will be described below as being implemented in an indium phosphide (InP) material system, and specifically in an optical modulator fabricated using indium gallium arsenide phosphide (InGaAsP) on an InP substrate. However, the semiconductor optical modulator having a quantum well structure for increasing photocurrent generating capability can be implemented in devices fabricated using other materials, such as aluminum gallium indium arsenide (AlGaInAs).

Figure 1A:
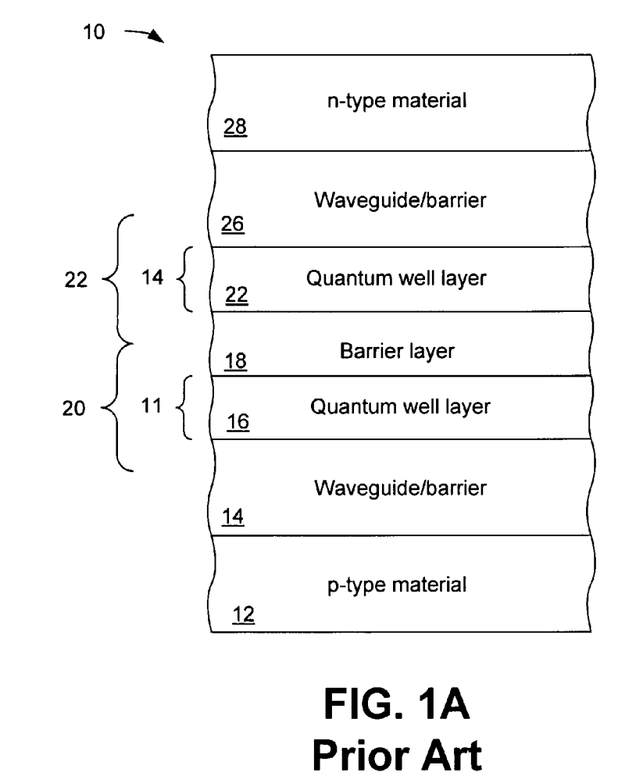
FIG. 1A is a schematic diagram illustrating a portion of a conventional semiconductor optical modulator 10.

FIG. 1A is a schematic diagram illustrating a portion of a conventional semiconductor optical modulator 10. The optical modulator 10 includes a p-type material layer 12 over which a waveguide layer 14 is formed. A quantum well layer 16 is formed over the waveguide layer 14. A barrier layer 18 is formed over the quantum well layer 16. Another quantum well layer 22 is formed over the barrier layer 18 and another waveguide layer 26 is formed over the quantum well layer 22. An n-type material layer 28 is formed over the waveguide layer 26. The material that forms the layers of optical modulator 10 can be chosen from the indium phosphide material system, or from other material systems, depending on the desired operating characteristics of the optical modulator 10.

The quantum well layer 16 forms a quantum well 11 and the quantum well layer 22 forms a quantum well 14. In this example, the waveguide layer 14 also functions as a barrier layer for the quantum well 11 and the waveguide layer 26 functions as a barrier layer for the quantum well 14. The waveguide layer 14, quantum well layer 16 and the barrier layer 18 form a quantum well structure 20. The barrier layer 18, the quantum well layer 22 and the waveguide layer 26 form a quantum well structure 22. The material of the quantum well layers 16 and 22 has a lower bandgap than the material of the waveguide layers 14 and 26 and the material of the barrier layer 18. While two quantum well structures are shown in FIG. 1A, a greater or lesser number of quantum well structures may be formed in the optical modulator 10.

Figure 1B:
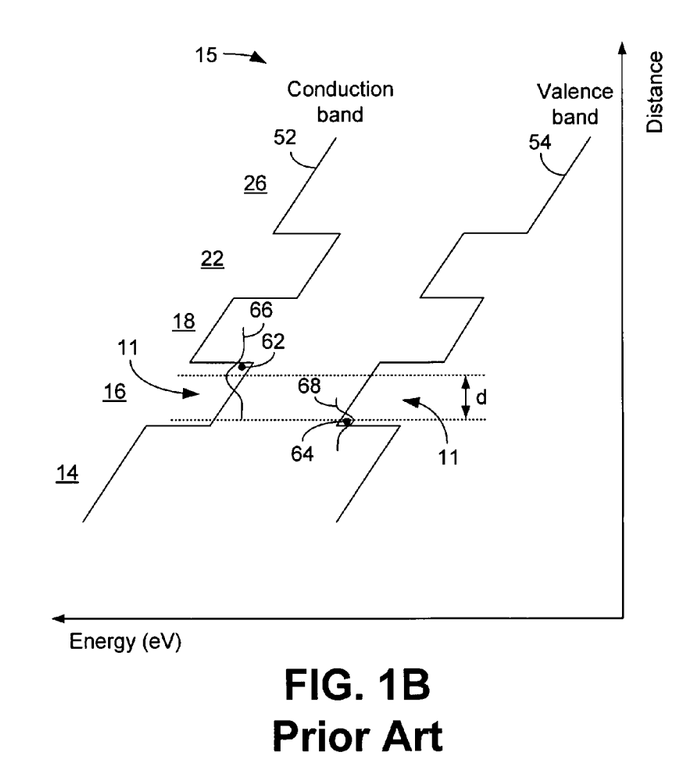
FIG. 1B is an energy band diagram showing the conduction band profile and the valence band profile for the optical modulator of FIG. 1A under reverse electrical bias.

FIG. 1B is an energy band diagram 15 showing the conduction band profile and the valence band profile for the optical modulator 10 of FIG. 1A under reverse electrical bias. The optical modulator 10 typically operates under a reverse electrical bias. The profile of the conduction band 52 and the profile of the valence band 54 show the variation of band energy with distance.

In the example shown, the conduction band energy of the material of the quantum well layers 16 and 22 is less than the energy of the waveguide layers 14 and 26 and the barrier layer 18. The valence band profile is generally a mirror image of the conduction band profile, in which the valence band energy of the material of the quantum well layers 16 and 22 is greater than the energy of the waveguide layers 14 and 26 and the barrier layer 18. The conduction band and valence band energy changes abruptly at the interface of the quantum well layer 16 and the waveguide layer 14 and the barrier layer 18. Similarly, the conduction band and valence band energy changes abruptly at the interface of the quantum well layer 22 and the waveguide layer 26 and the barrier layer 18.

When reverse biased, the optical modulator 10 operates to convert light at the wavelength directed onto the quantum well structures 20 and 22 into electron-hole pairs in the quantum wells 11 and 14. For example, light absorption will cause a bound electron 62 to be generated in the quantum well 11 in the conduction band 52 and a bound hole 64 to be generated in the quantum well 11 in the valence band 54. In order for the optical modulator 10 to respond rapidly and not suffer from saturation due to light absorption at high optical powers, the photogenerated electrons and holes must be extracted from the quantum wells and swept toward the contacts (not shown, but in electrical contact with the p-type material layer 12 and the n-type material layer 28). However, to be extracted, the electrons and holes must overcome the energy barrier at the interface of the quantum well layer and the adjacent barrier layers, then drift in the applied field toward the surrounding n- and p-type layers, respectively, and be collected at the contacts to become a photocurrent.

The wave function of the electrons in the conduction band is illustrated at 66 and the wave function of the holes in the valence band is illustrated at 68. As shown in FIG. 1B, the peak of the electron wave function 66 is displaced by a distance, "d", from the peak of the hole wave function 68. This displacement between the peaks of the wave functions 66 and 68 occurs due to the electric field across the quantum well structures 20 and 22. As a result of the reverse bias, the electron distribution in the conduction band is concentrated toward the n-type side of the optical modulator, and the hole distribution in the valence band is concentrated toward the p-type side of the optical modulator 10. This concentration of electrons and holes is illustrated in the displacement between the peaks of the respective wave functions 66 and 68. The concentration of electrons and holes as described means the spatial overlap between the electron and hole wavefunctions is reduced and results in an absorption coefficient that is lower than the absorption coefficient possible if the peaks of the respective wave functions 66 and 68 were more closely aligned. The misalignment of the peaks limits the absorption coefficient of the optical modulator 10.

Figure 2A:
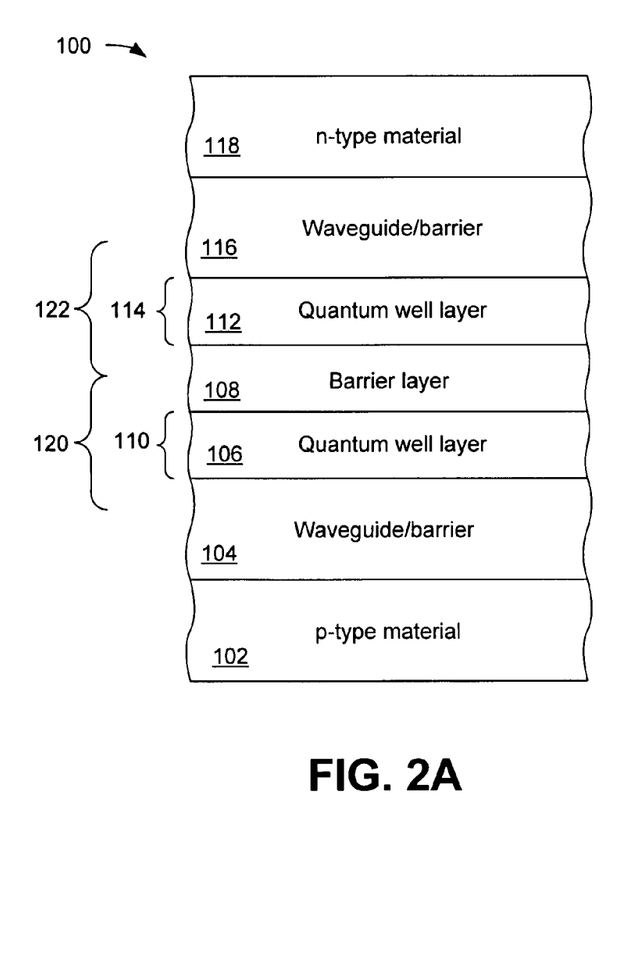
FIG. 2A is a schematic diagram illustrating a portion of a semiconductor optical modulator fabricated in accordance with an embodiment of the invention.

FIG. 2A is a schematic diagram illustrating a portion of a semiconductor optical modulator 100 fabricated in accordance with an embodiment of the invention. The optical modulator 100 includes a p-type material layer 102 over which a waveguide layer 104 is formed. A quantum well layer 106 is formed over the waveguide layer 104. In this embodiment of the invention, the quantum well layer 106 is formed to have a graded composition that is not uniform throughout the thickness of the layer. In this example, the quantum well layer 106 has a thickness of approximately 5–10 nanometers (nm) and has a minimum bandgap energy at the quantum well layer-waveguide layer interface and a maximum bandgap energy that approximates the bandgap energy of the barrier layer 108 at the quantum well layer-barrier layer interface. In this example, the quantum well layer 106 is linearly graded having a bandgap energy that increases in the direction from the waveguide layer 104 toward the barrier layer 108, but other grading can also be employed.

A barrier layer 108 is formed over the quantum well layer 106. Another quantum well layer 112 with graded composition is formed over the barrier layer 108 and another waveguide layer 116, similar in structure to the waveguide layer 104, is formed over the quantum well layer 112. In this example, the quantum well layer 112 has a thickness of approximately 5–10 nanometers (nm), but can have a thickness different than the thickness of the quantum well layer 106. The quantum well layer 112 has a minimum bandgap energy at the quantum well layer-barrier layer interface and a maximum bandgap energy that approximates the bandgap energy of the waveguide layer 116 at the quantum well layer-waveguide layer interface. In this example, the quantum well layer 112 is linearly graded having a bandgap energy that increases in the direction from the barrier layer 108 toward the waveguide layer 116, but other grading can also be employed. Further, the minimum bandgap energy at the interface of the quantum well layer 106 and the waveguide layer 104 can be different than the minimum bandgap energy at the interface of the quantum well layer 112 and the barrier layer 108.

An n-type material layer 118 is formed over the waveguide layer 116. The material that forms the layers of optical modulator 100 can be chosen from the indium phosphide material system, or from other material systems, depending on the desired wavelength and operating characteristics of the optical modulator 100. Further, the layers of the optical modulator 100 can be formed using known semiconductor processing techniques, such as organo-metallic vapor phase epitaxy (OMVPE), metal organic chemical vapor deposition (MOCVD), molecular beam epitaxy (MBE) or other known processing techniques.

In this example, the waveguide layer 104 also functions as a barrier layer for the quantum well 110 and the waveguide layer 116 functions as a barrier layer for the quantum well 114. The waveguide layer 104, quantum well layer 106 and the barrier layer 108 form a quantum well structure 120. The barrier layer 108, the quantum well layer 112 and the waveguide layer 116 form a quantum well structure 122. The quantum well structures 120 and 122 respectively define quantum wells 110 and 114. While two quantum well structures are shown in FIG. 2A, a greater or lesser number of quantum well structures may be formed in the optical modulator 100.

The alloy material of the quantum well layer 106 includes the same elements as the waveguide layer 104 and barrier layer 108, but the composition is adjusted to reduce the bandgap energy of the quantum well layer 106 relative to that of the waveguide layer 104. In this embodiment, the alloy composition in the quantum well layer 106 is progressively changed in the direction away from the waveguide layer 104 resulting in an increase in the bandgap energy of the quantum well layer 106 as the distance away from the waveguide layer 104 is increased. The alloy composition can also be changed using multiple stepped changes. Similarly, the alloy material of the quantum well layer 112 includes the same elements as the waveguide layer 116 and barrier layer 108, but the composition is adjusted to reduce the bandgap energy of the quantum well layer 112 relative to that of the barrier layer 108. In this embodiment, the alloy composition in the quantum well layer 112 is progressively changed in the direction away from the barrier layer 108 resulting in an increase in the bandgap energy of the quantum well layer 112 as the distance away from the barrier layer 108 is increased.

The graded composition of the quantum well layers 106 and 112 alter the shape of the quantum wells 110 and 114, respectively, to enhance the extraction of photogenerated carriers from the quantum well structures 120 and 122, and increase the absorption coefficient. The grading applied to the composition of quantum well layers 106 and 112 alters the energy profile of the quantum wells 110 and 114 in the conduction band and the valence band so that the electrons and holes in the conduction band and valence band, respectively, concentrate at the interface of the quantum well 106 and the waveguide layer 104, and at the interface of the quantum well layer 112 and the barrier layer 108, promoting the formation of electron-hole pairs in those areas. This results in a reduction of the distance "d" between the peak of the electron wave function and the hole wave function as compared to a conventional optical modulator.

In the example, a modulator designed to operate at 1550 nm wavelength is shown. The material of the p-type layer 102 is indium phosphide (InP), and the material of the waveguide layer 104 is indium gallium arsenide phosphide (InGaAsP) having the exemplary composition $In_{0.85}Ga_{0.15}As_{0.33}P_{0.67}$. The material of the quantum well layer 106 is $In_xGa_{1-x}As_yP_{1-y}$, where 0<x<1 and 0<y<1, and where the indium fraction x and the arsenic fraction y vary through the thickness of the quantum well layer. In this example, the indium fraction progressively increases with distance from the waveguide layer 104 and the arsenic fraction progressively decreases with distance from the waveguide layer 104. In this example, the indium fraction is about 0.61 and the arsenic fraction is about 0.84 at the interface of the quantum well layer 106 and the waveguide layer 104. The indium fraction increases progressively to a maximum of about 0.85 and the arsenic fraction progressively decreases to about to 0.33 at the interface of the quantum well layer 106 and the barrier layer 108. Here, the composition value x is defined as the ratio of the concentration of indium atoms in the material to the concentration of all Group III atoms (in this example, indium plus gallium) in the material. Likewise, the composition value y is defined as the ratio of the concentration of arsenic atoms in the material to the concentration of all Group V atoms (in this example, arsenic plus phosphorous) in the material. For example, a phosphorous fraction of one percent means that, on average, in every 100 Group V atoms in the material there is one atom of phosphorous. For $InGaAs_{0.99}P_{0.01}$ (InGaAsP with a phosphorous fraction of 0.01 and an arsenic fraction of 0.99) of every 100 Group V atoms in the material, on average there is one atom of phosphorous and 99 atoms of arsenic.

The material of the barrier layer 108 is $(In_{0.85}Ga_{0.15}As_{0.33}P_{0.67})$. The material and fabrication of the quantum well layer 112 is typically similar to the material and the fabrication of the quantum well layer 106. The material of the waveguide layer 116 is ($In_{0.85}Ga_{0.15}As_{0.33}P_{0.67}$) and the material of the n-type layer 118 is InP.

The fabrication of the optical modulator 100 described above can also be applied to an optical modulator fabricated using the aluminum indium gallium arsenide (AlInGaAs) material system. The AlInGaAs material system is also lattice matched to InP and may be used in modulators designed to operate in the 1300–1350 nm wavelength communication band.

Figure 2B:
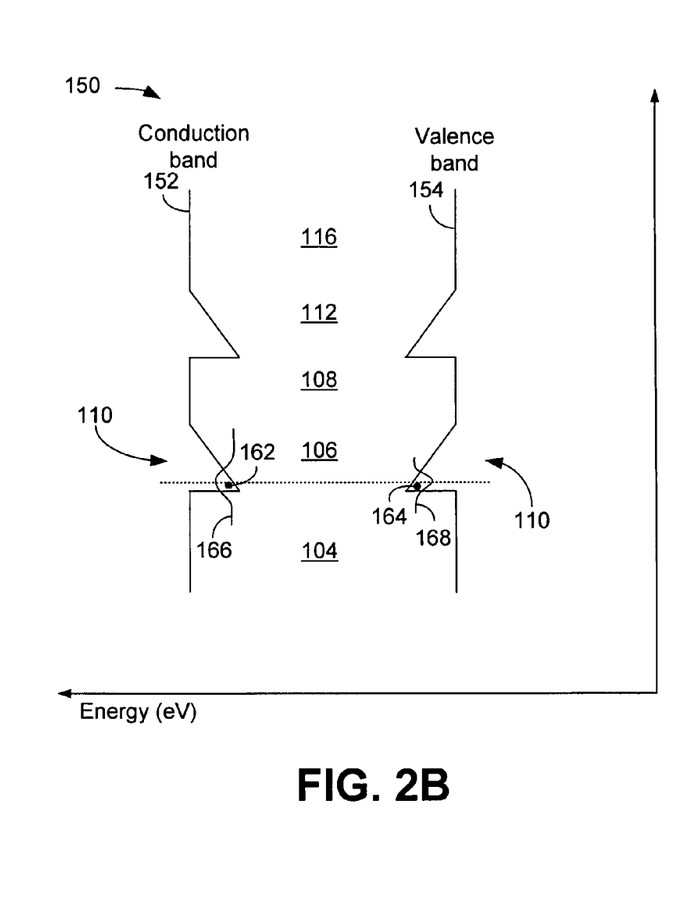
FIG. 2B is an energy band diagram showing the conduction band profile and the valence band profile for the optical modulator of FIG. 2A under zero or a modest forward electrical bias, also referred to as a "flat band" condition.

FIG. 2B is an energy band diagram 150 showing the conduction band profile and the valence band profile for the optical modulator 100 of FIG. 2A under zero or a modest forward electrical bias, also referred to as a "flat band" condition.

The quantum well having a graded bandgap energy profile is shown at 110 in the conduction band 152 and in the valence band 154. The electrons 162 in the conduction band 152 and the holes 164 in the valence band 154 are now concentrated on the p-side of the quantum well 110. Correspondingly, the peak of the electron wave function 166 closely aligns with the peak of the hole wave function 168 near the interface of the quantum well layer 106 and the waveguide layer 104, substantially reducing the distance between the peaks of the wave functions 166 and 168. This results in a greater spatial overlap between the photogenerated carriers and results in a larger absorption coefficient and a greater extinction ratio. The extinction ratio is the ratio of the light absorption between the modulator's "on" and "off" states.

The graded energy profile of the quantum well layers 106 and 112 also enhances the ability to extract the electron-hole pairs from the quantum wells 110 and 114. The graded energy profile of the quantum well 110 provides a lower energy barrier to the electron 162, thus maximizing the response and limiting saturation effects of the optical modulator 100.

Figure 3A:
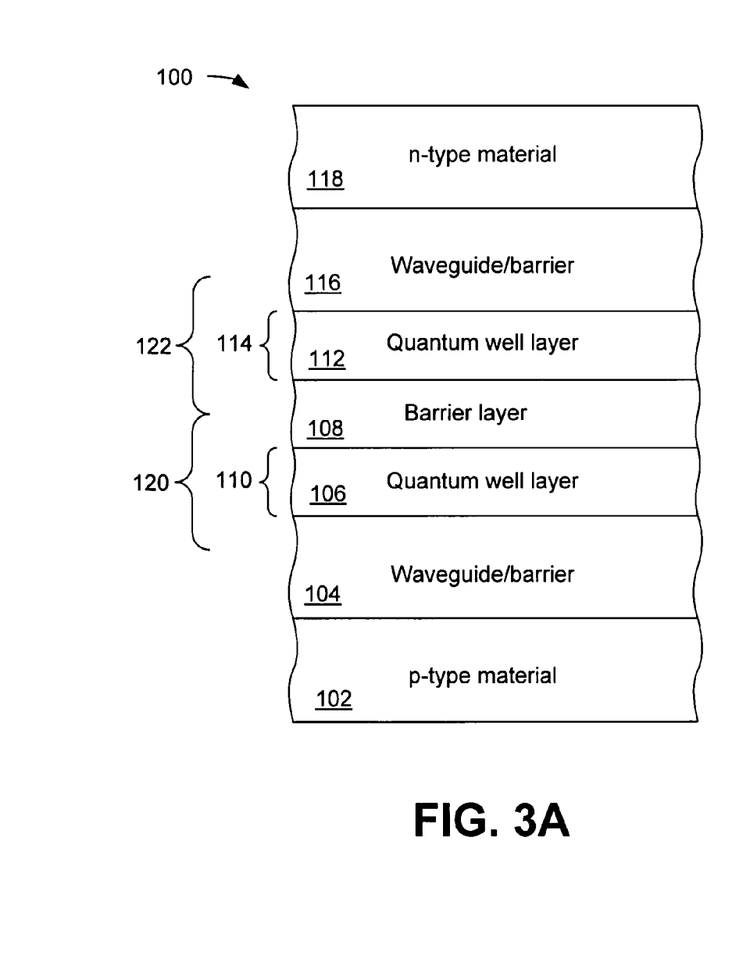
FIG. 3A is a schematic diagram illustrating a portion of the semiconductor optical modulator of FIG. 2A under a reverse electrical bias.

FIG. 3A is a schematic diagram illustrating a portion of the semiconductor optical modulator 100 of FIG. 2A under a reverse electrical bias. The semiconductor optical modulator 100 is shown for reference with respect to the energy band diagram 150 of FIG. 3B and a description thereof will not be repeated.

Figure 3B:
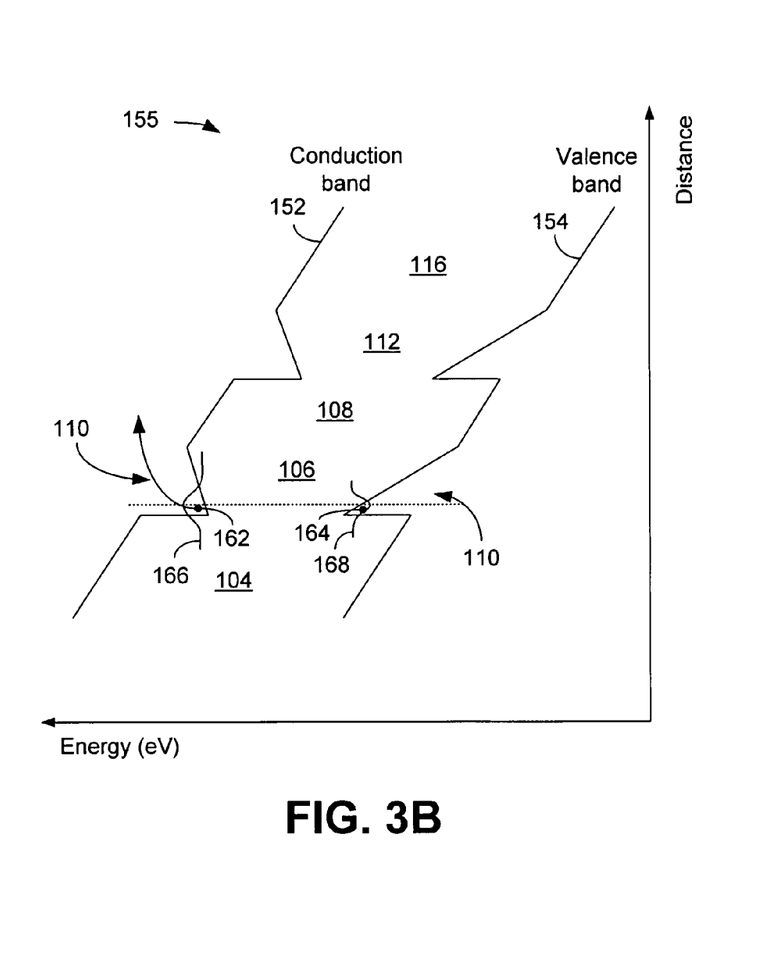
FIG. 3B is an energy band diagram showing the conduction band profile and the valence band profile for the optical modulator of FIG. 3A under reverse electrical bias.

FIG. 3B is an energy band diagram 155 showing the conduction band profile and the valence band profile for the optical modulator 100 of FIG. 3A under reverse electrical bias.

In operation, a reverse electrical bias is applied to the optical modulator 100 to exploit the Quantum Confined Stark Effect. As mentioned above, the Quantum Confined Stark Effect is a phenomenon that allows the subband energy separation of the material used to form the quantum wells 110 and 114 of the optical modulator 100 to be shifted using a reverse electrical bias applied to the optical modulator 100. With a given applied reverse bias voltage, if the shift of the subband energy separation is sufficient, light with a particular wavelength will be absorbed and converted to a photocurrent by the optical modulator 100. The shift of the subband energy separation changes proportionally with the applied reverse bias voltage. The energy at which the optical modulator 100 absorbs light is referred to as the absorption edge. Increasing the reverse electrical bias lowers the energy corresponding to the absorption edge of the optical modulator. The shifting of the bandgap edges creates what is referred to as a "field effect." A field effect optical modulator can operate at speeds on the order of 40–50 gigabits per second (Gb/sec).

The quantum well having a graded bandgap energy profile is shown at 110 in the conduction band 152 and in the valence band 154. As mentioned above, the electrons 162 in the conduction band and the holes 164 in the valence band are concentrated on the p-side of the quantum well 110. Correspondingly, the peak of the electron wave function 166 closely aligns with the peak of the hole wave function 168, substantially reducing the distance between the peaks of the wave functions 166 and 168. This results in a greater spatial overlap between the photogenerated carriers and results in a larger absorption coefficient and a greater extinction ratio.

The graded energy profile of the quantum well layers 106 and 112 also reduces the energy required to extract the electrons from the quantum wells 110 and 114. The graded energy profile of the quantum well 110 provides a lower energy barrier to the electron 162 in the quantum wells 110 and 114, thus maximizing the photocurrent that can be generated by the optical modulator 100 and the speed at which the optical modulator 100 can operate. In an alternative embodiment in which the quantum well layers are graded in the opposite direction such that the bandgap energy at the interface of the quantum well layer 106 and the barrier layer 108 is higher in the valence band than the bandgap energy at the interface of the quantum well layer 106 and the waveguide layer 104 in the valence band, then the energy required to extract holes from the quantum wells 110 and 114 would be reduced.

Figure 4A:
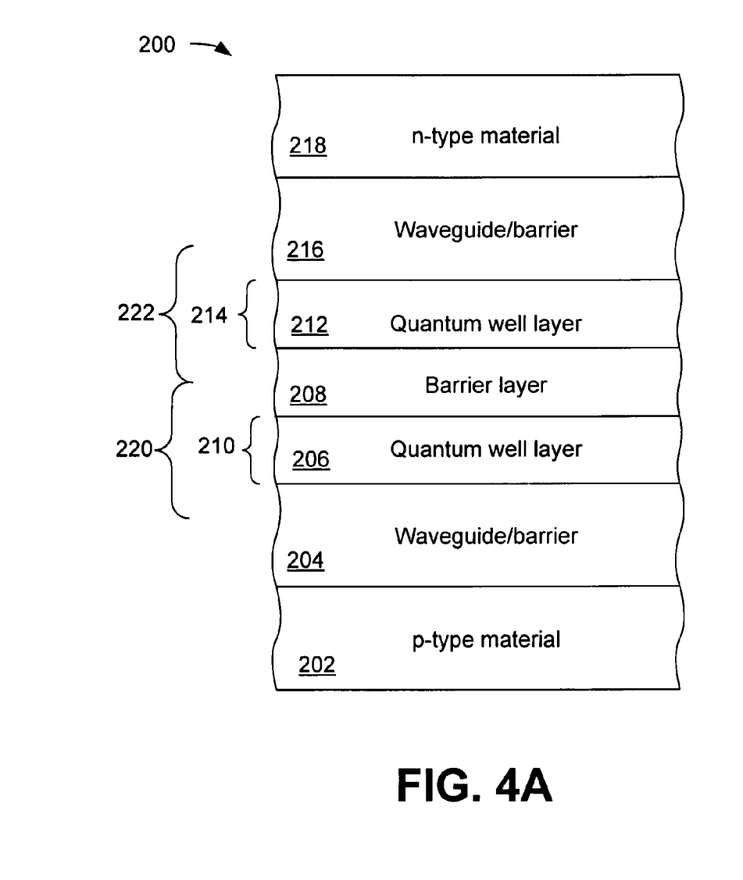
FIG. 4A is a schematic diagram illustrating a portion of a semiconductor optical modulator 200 fabricated in accordance with an alternative embodiment of the invention.

FIG. 4A is a schematic diagram illustrating a portion of a semiconductor optical modulator 200 fabricated in accordance with an alternative embodiment of the invention. The optical modulator 200 includes a p-type material layer 202 over which a waveguide layer 204 is formed. A quantum well layer 206 is formed over the waveguide layer 204. In this embodiment of the invention, the quantum well layer 206 is formed to have a graded composition that is not uniform throughout the thickness of the layer. In this example, the quantum well layer 206 has a thickness of approximately 5–10 nanometers (nm) and has a maximum bandgap energy that approximates the bandgap energy of the waveguide layer 204 at the quantum well layer-waveguide layer interface and a minimum bandgap energy at the quantum well layer-barrier layer interface. In this example, the quantum well layer 206 is linearly graded having a bandgap energy that decreases in the direction from the waveguide layer 204 toward the barrier layer 208, but other grading can also be employed.

A barrier layer 208 is formed over the quantum well layer 206. Another graded composition quantum well layer 212 is formed over the barrier layer 208 and another waveguide layer 216, similar in structure to the waveguide layer 204, is formed over the quantum well layer 212. In this example, the quantum well layer 212 has a thickness of approximately 5–10 nanometers (nm), but can have a thickness different than the thickness of the quantum well layer 206. The quantum well layer 212 has a maximum bandgap energy that approximates the bandgap energy of the barrier layer 208 at the quantum well layer-barrier layer interface and a minimum bandgap energy at the quantum well layer-waveguide layer interface. In this example, the quantum well layer 212 is linearly graded having a bandgap energy that decreases in the direction from the barrier layer 208 toward the waveguide layer 216, but other grading can also be employed. Further, the minimum bandgap energy at the interface of the quantum well layer 206 and the barrier layer 208 can be different than the minimum bandgap energy at the interface of the quantum well layer 212 and the waveguide layer 216.

An n-type material layer 218 is formed over the waveguide layer 216. The material that forms the layers of optical modulator 200 can be chosen from the same group of materials as the optical modulator 100. Further, the layers of the optical modulator 200 can be formed using the same techniques as those used to form the optical modulator 100.

In this example, the waveguide layer 204 also functions as a barrier layer for the quantum well 210 and the waveguide layer 216 functions as a barrier layer for the quantum well 214. The waveguide layer 204, quantum well layer 206 and the barrier layer 208 form a quantum well structure 220. The barrier layer 208, the quantum well layer 212 and the waveguide layer 216 form a quantum well structure 222. The quantum well structures 220 and 222 respectively define quantum wells 210 and 214. While two quantum well structures are shown in FIG. 4A, a greater or lesser number of quantum well structures may be formed in the optical modulator 200.

The alloy material of the quantum well layer 206 includes the same elements as the waveguide layer 204 and barrier layer 208, but the composition is adjusted to reduce the bandgap energy of the quantum well layer 206 relative to that of the barrier layer 208. In this embodiment, the alloy composition in the quantum well layer 206 is progressively changed in the direction away from the waveguide layer 204 resulting in a decrease in the bandgap energy of the quantum well layer 206 as the distance away from the waveguide layer 204 is increased. The alloy composition can also be changed using multiple stepped changes. Similarly, the alloy material of the quantum well layer 212 includes the same elements as the waveguide layer 216 and barrier layer 208, but the composition is adjusted to reduce the bandgap energy of the quantum well layer 212 relative to that of the waveguide layer 216. In this embodiment, the alloy composition in the quantum well layer 212 is progressively changed in the direction away from the barrier layer 208 resulting in a decrease in the bandgap energy of the quantum well layer 212 as the distance away from the barrier layer 208 is increased.

The graded composition quantum well layers 206 and 208 alter the shape of the quantum wells 210 and 214, respectively, to enhance the extraction of photogenerated carriers from quantum well structures 220 and 222, and increase the absorption coefficient. The grading applied to the composition of the quantum well layers 206 and 212 alters the energy profile of the quantum wells 210 and 214 in the conduction band and the valence band so that the electrons and holes in the conduction band and valence band, respectively, concentrate at the interface of the quantum well 206 and the barrier layer 208, and at the interface of the quantum well layer 212 and the waveguide layer 216, promoting the formation of electron-hole pairs in those areas. The grading of the material of the quantum well layers 206 and 212 in the embodiment shown in FIG. 4A causes the carriers to concentrate toward the n-type side of the respective quantum well layers 206 and 212. This results in a reduction of the distance between the peak of the electron wave function and the hole wave function as compared to a conventional square-well optical modulator.

In the example shown in FIG. 4A, the material of the layers can be similar to the corresponding material layers of the optical modulator 100 shown in FIG. 2A, the detail of which will not be repeated. In this example, the indium fraction in the quantum well layer 206 progressively decreases with distance from the waveguide layer 204 and the arsenic fraction in the quantum well layer 206 progressively increases with distance from the waveguide layer 204. In this example, the indium fraction is about 0.85 and the arsenic fraction is about 0.33 at the interface of the quantum well layer 206 and the waveguide layer 204. The indium fraction decreases progressively to about 0.61 and the arsenic fraction increases to about 0.84 at the interface of the quantum well layer 206 and the barrier layer 208. The material and fabrication of the quantum well layer 212 can be similar to the material and the fabrication of the quantum well layer 206.

Figure 4B:
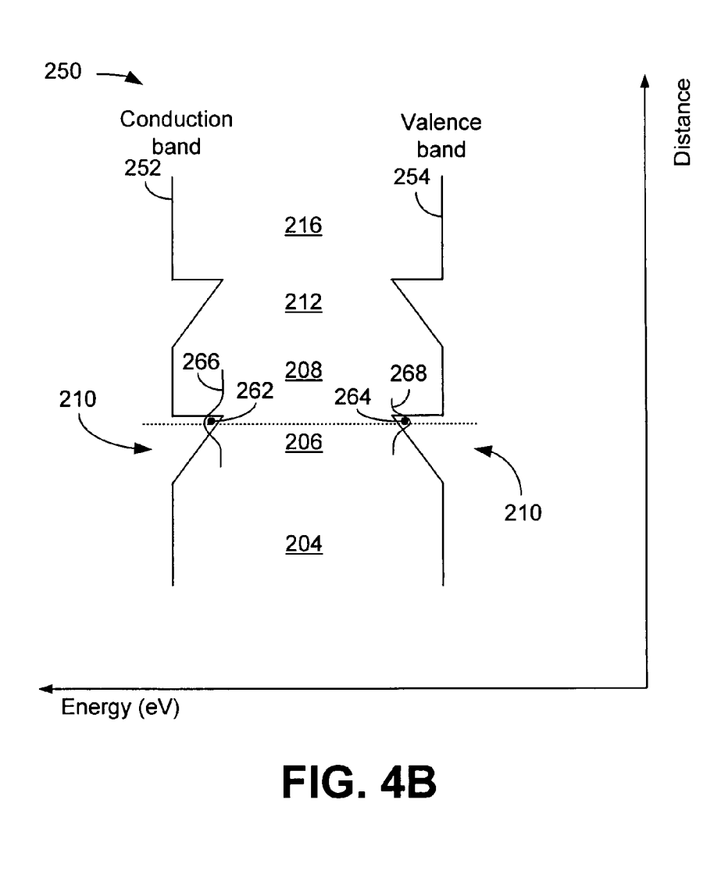
FIG. 4B is an energy band diagram showing the conduction band profile and the valence band profile for the optical modulator of FIG. 4A under zero or a modest forward electrical bias.

FIG. 4B is an energy band diagram 250 showing the conduction band profile and the valence band profile for the optical modulator 200 of FIG. 4A under zero or a modest forward electrical bias.

The quantum well having a graded bandgap energy profile is shown at 210 in the conduction band 252 and in the valence band 254. The electrons 262 in the conduction band 252 and the holes 264 in the valence band 264 are concentrated on the n-side of the quantum well 210. Correspondingly, the peak of the electron wave function 266 closely aligns with the peak of the hole wave function 268 near the interface of the quantum well layer 206 and the barrier layer 208, substantially reducing the distance between the wave functions 266 and 268. This results in a greater spatial overlap between the photogenerated carriers and results in a larger absorption coefficient and a greater extinction ratio.

The graded energy profile of the quantum well layers 206 and 212 also enhances the ability to extract holes from the quantum wells 210 and 214. The graded energy profile of the quantum well 210 provides a lower energy barrier to the hole 264 toward the p-type side of the quantum wells 210 and 214, thus improving response and limiting saturation effects of the optical modulator 200.

Figure 5A:
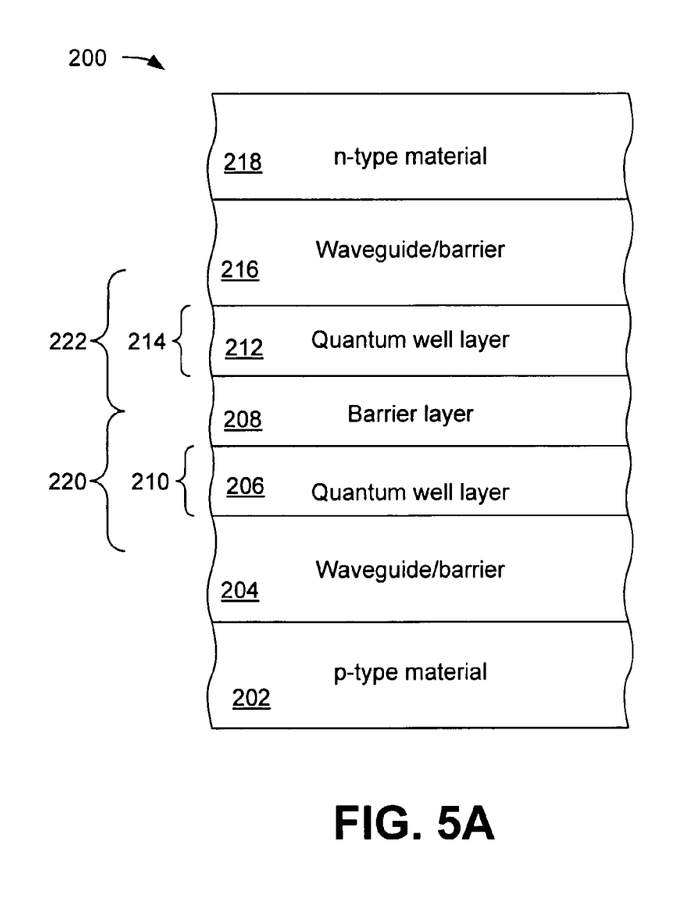
FIG. 5A is a schematic diagram illustrating a portion of the semiconductor optical modulator of FIG. 4A under a reverse electrical bias.

FIG. 5A is a schematic diagram illustrating a portion of the semiconductor optical modulator 200 of FIG. 4A under a reverse electrical bias. The semiconductor optical modulator 200 is shown for reference with respect to the energy band diagram 255 of FIG. 5B and a description thereof will not be repeated.

Figure 5B:
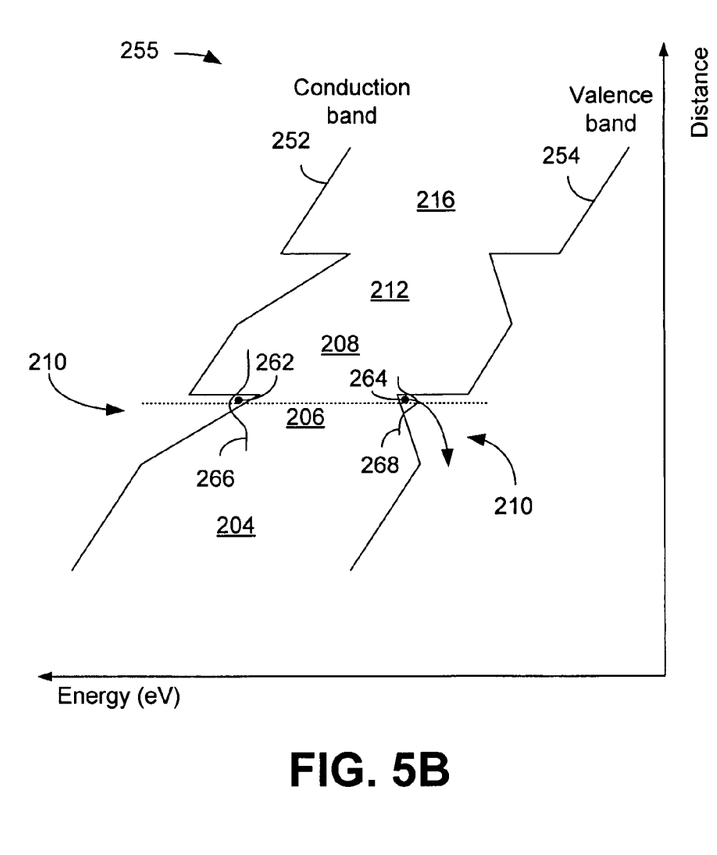
FIG. 5B is an energy band diagram showing the conduction band profile and the valence band profile for the optical modulator 200 of FIG. 5A under reverse electrical bias.

FIG. 5B is an energy band diagram 255 showing the conduction band profile and the valence band profile for the optical modulator 200 of FIG. 5A under reverse electrical bias.

As described above, in operation, a reverse electrical bias is applied to the optical modulator 200 to exploit the Quantum Confined Stark Effect. The quantum well having a graded bandgap energy profile is shown at 210 in the conduction band 252 and in the valence band 254. In this embodiment, the electrons 262 in the conduction band and the holes 264 in the valence band are concentrated on the n-side of the quantum well 210. Correspondingly, the peak of the electron wave function 266 closely aligns with the peak of the hole wave function 268, substantially reducing the distance between the peaks of the wave functions 166 and 168. This results in a greater spatial overlap between the photogenerated carriers and results in a larger absorption coefficient and a greater extinction ratio.

The graded energy profile of the quantum well layers 206 and 212 also reduces the energy required to extract holes from the quantum wells 210 and 214. The graded energy profile of the quantum well 210 provides a lower energy barrier to the hole 264 toward the p-type side of the quantum wells 210 and 214, thus maximizing the photocurrent that can be generated by the optical modulator 200.

Figure 6A:
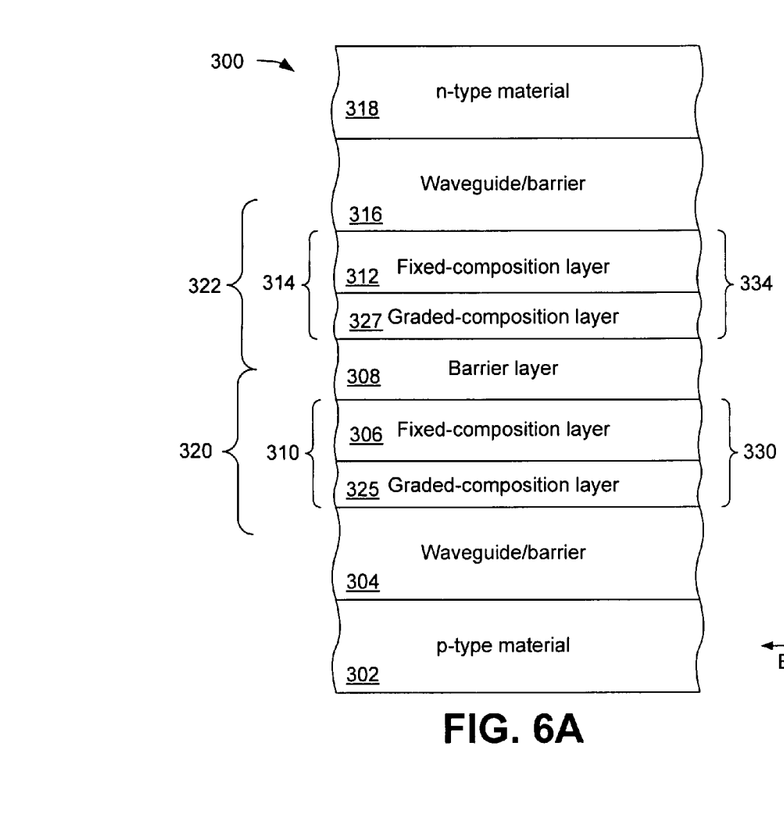
FIG. 6A is a schematic diagram illustrating a portion of a semiconductor optical modulator fabricated in accordance with another embodiment of the invention.

FIG. 6A is a schematic diagram illustrating a portion of a semiconductor optical modulator 300 fabricated in accordance with another embodiment of the invention. The optical modulator 300 includes a p-type material layer 302 over which a waveguide layer 304 is formed. In this embodiment of the invention, a graded-composition layer 325 is formed over the waveguide layer 304 and a fixed-composition layer 306 is formed over the graded-composition layer 325. The graded-composition layer 325 and the fixed-composition layer 306 form a quantum well layer 330. In this example, the fixed-composition layer 306 has a thickness of approximately 5–10 nanometers (nm). The graded-composition layer 325 is formed having an alloy composition that is not uniform throughout the thickness of the layer. In this example, the graded-composition layer 325 has a thickness of approximately 1–10 nanometers (nm) and has a minimum bandgap energy at the graded-composition layer-fixed-composition layer interface and a maximum bandgap energy that approximates the bandgap energy of the waveguide layer 304 at the graded-composition layer-waveguide layer interface. In this example, the graded-composition layer 325 is linearly graded having a bandgap energy that decreases in the direction from the waveguide layer 304 toward the fixed-composition layer 306, but other grading can also be employed. Further, the term "fixed" does not preclude small variations in composition due to process variations, etc.

A barrier layer 308 is formed over the fixed-composition layer 306. Another graded-composition layer 327 is formed over the barrier layer 308 and another fixed-composition layer 312 is formed over the graded-composition layer 327. The graded-composition layer 327 and the fixed-composition layer 312 form a quantum well layer 334. Another waveguide layer 316, similar in structure to the waveguide layer 304, is formed over the fixed-composition layer 312. In this example, the fixed-composition layer 312 has a thickness of approximately 5–10 nanometers (nm), but can have a thickness different than the thickness of the fixed-composition layer 306.

The graded-composition layer 327 has a minimum bandgap energy at the graded-composition layer-fixed-composition layer interface and a maximum bandgap energy that approximates the bandgap energy of the barrier layer 308 at the graded-composition layer-barrier layer interface. In this example, the graded-composition layer 327 is linearly graded having a bandgap energy that decreases in the direction from the barrier layer 308 toward the fixed-composition layer 312, but other grading can also be employed. Further, the minimum bandgap energy at the interface of the graded-composition layer 325 and the fixed-composition layer 306 can be different than the minimum bandgap energy at the interface of the graded-composition layer 327 and the fixed-composition layer 312.

An n-type material layer 318 is formed over the waveguide layer 316. The material that forms the layers of optical modulator 300 can be chosen from the indium phosphide material system, or from other material systems, depending on the desired operating characteristics of the optical modulator 300. Further, the layers of the optical modulator 300 can be formed using known semiconductor processing techniques as described above.

In this example, the waveguide layer 304 also functions as a barrier layer for the quantum well layer 330 and the waveguide layer 316 function as a barrier layer for the quantum well layer 334. The waveguide layer 304, quantum well layer 330 and the barrier layer 308 form a quantum well structure 320. The barrier layer 308, quantum well layer 334 and the waveguide layer 316 form a quantum well structure 322. The quantum well structure 320 defines a quantum well 310 and the quantum well structure 322 defines a quantum well 314. While two quantum well structures are shown in FIG. 6A, a greater or lesser number of quantum well structures may be formed in the optical modulator 300.

The alloy material of the fixed-composition layers 306 and 312 are of a composition that reduces the bandgap energy of the fixed-composition layers 306 and 312 relative to that of the waveguide layers 304 and 316 and the barrier layer 308. In this embodiment, the fixed-composition layers 306 and 312 have a fixed composition resulting in a constant bandgap energy. The graded-composition layer 325 is formed from the same elements as the waveguide layer 304 and the barrier layer 308, but its alloy composition is progressively changed to reduce the bandgap energy of the graded-composition layer 325 relative to that of the waveguide layer 304 and the barrier layer 308. In this embodiment, the graded-composition layer 325 is formed using InGaAsP in which the indium content is progressively decreased and the arsenic content is progressively increased as the distance from the waveguide layer 304 increases, resulting in a reduction in the bandgap energy of the graded-composition layer 325 as the distance from the waveguide layer 304 increases. The alloy composition can also be changed using multiple stepped changes. Similarly, the graded-composition layer 327 is formed from the same elements as the waveguide layer 316 and the barrier layer 308, but its alloy composition is progressively changed to reduce the bandgap energy of the graded-composition layer 327 relative to that of the waveguide layer 316 and the barrier layer 308. In this embodiment, the graded-composition layer 327 is formed using InGaAsP in which the indium content is progressively decreased and the arsenic content is progressively increased as the distance from the barrier layer 308 increases, resulting in a reduction in the bandgap energy of the graded-composition layer 327 as the distance from the barrier layer 308 increases.

The graded-composition layers 325 and 327 alter the shape of the quantum wells 310 and 314, respectively, to enhance the extraction of photogenerated charge carriers from the quantum well structures 320 and 322 and increase the absorption coefficient, while providing well defined quantum wells 310 and 314. The grading applied to the graded-composition layers 325 and 327 alters the energy profile at the fixed-composition layer-graded-composition layer interfaces in the conduction band and the valence band so that the electrons and holes in the conduction band and valence band, respectively, are generated in well-defined quantum wells 310 and 314, while providing a reduced energy barrier at the fixed-composition layer-graded-composition layer interfaces, so that holes can be easily extracted from the quantum wells 310 and 314. In an alternative embodiment, reversing the grading direction of the graded-composition layers 325 and 327 would improve the extraction of electrons from the optical modulator 300.

In the example shown, the material of the p-type layer 302, the waveguide layers 304 and 316 and the barrier layer 308 is similar to the respective layers of the optical modulators 100 and 200 described above.

In an example, the material of the fixed-composition layers 306 and 312 is $In_{0.61}Ga_{0.39}As_{0.84}P_{0.16}$. The material of the graded-composition layer 325 is indium gallium arsenide phosphide $(In_xGa_{1-x}As_yP_{1-y})$, where $0<x<1$ and $0<y<1$, and where the indium content x and the arsenic content y vary through the thickness of the graded-composition layer. In this example, the indium fraction progressively decreases and the arsenic fraction progressively increases with increasing distance from the waveguide layer 304. In this example, the indium content is about 0.7 and the arsenic content is about 0.7 at the interface of the graded-composition layer 325 and the fixed-composition layer 306. The indium content increases to about 0.85 and the arsenic content decreases to about 0.33 at the interface of the graded-composition layer 325 and the waveguide layer 304.

The fabrication of the optical modulator 300 described above can also be applied to an optical modulator fabricated using the aluminum indium gallium arsenide (AlInGaAs) material system. The AlInGaAs material system is also lattice matched to InP and may be used in modulators designed to operate in the 1300–1350 nm wavelength communication bands.

The material of the graded-composition layer 327 is similar to that of the graded-composition layer 325.

Figure 6B:
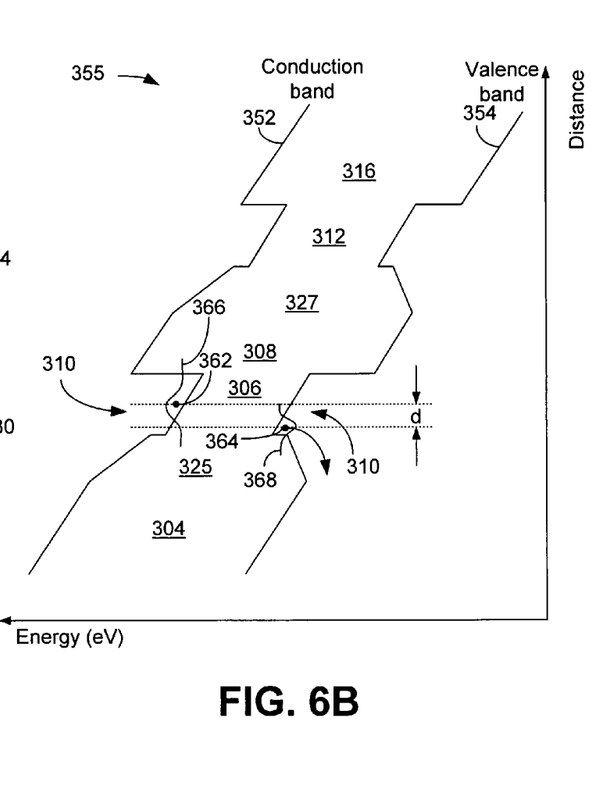
FIG. 6B is an energy band diagram showing the conduction band profile and the valence band profile for the optical modulator of FIG. 6A under reverse electrical bias.

FIG. 6B is an energy band diagram 355 showing the conduction band profile and the valence band profile for the optical modulator 300 of FIG. 6A under reverse electrical bias.

As described above, in operation, a reverse electrical bias is applied to the optical modulator 300 to exploit the Quantum Confined Stark Effect. The quantum well energy profile is shown at 310 in the conduction band 352 and in the valence band 354. The graded-composition layer energy profile provides well-defined quantum wells 310 and 314, while still allowing the carriers to be easily extracted from the quantum wells 310 and 314 so that the optical modulator 300 may be rapidly modulated and operated with minimal saturation.

The graded energy profile of the graded-composition layers 325 and 327 provides a lower energy barrier to the hole 364 toward the p-type side of the quantum wells 310 and 314, thus maximizing the response and limiting saturation effects of the optical modulator 300. In an alternative embodiment, reversing the grading direction of the graded-composition layers 325 and 327 would provide a lower energy barrier to the electron 362 toward the n-type side of the quantum wells 310 and 314, providing similar benefit as described above.

Figure 7:
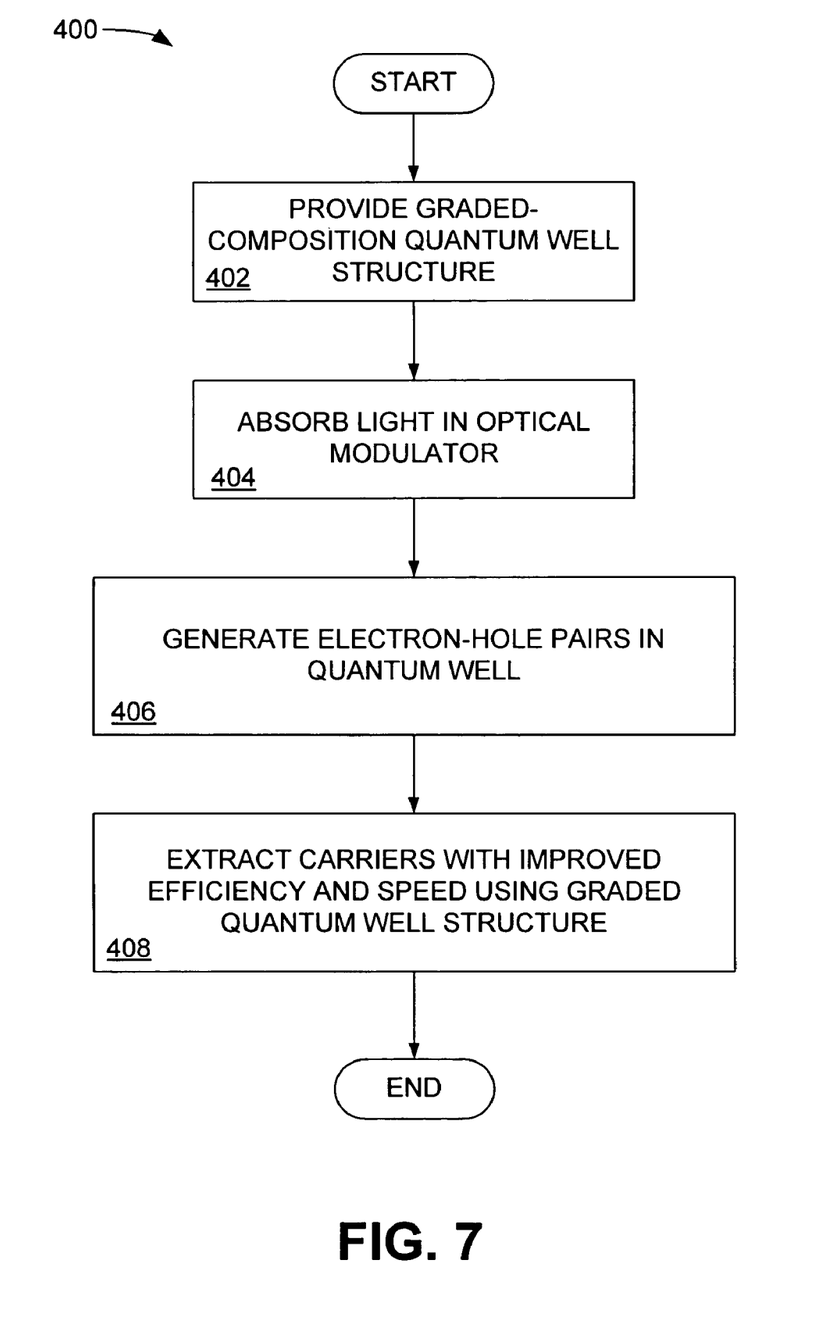
FIG. 7 is a flowchart illustrating a method of generating photocurrent by light absorption and subsequent extraction of carriers in a quantum well of an optical modulator.

FIG. 7 is a flowchart 400 illustrating a method of generating photocurrent by light absorption and subsequent extraction of carriers in a quantum well of an optical modulator. Although specific operations are disclosed in the flowchart 400, such operations are exemplary. Embodiments of the present invention are suited to performing various other operations or variations of the operations recited in the flowchart 400. Further, the operations in the flowchart 400 can be performed in an order different that that described. In block 402, a graded-composition quantum well structure is provided. In block 404, light is absorbed in an optical modulator. In block 406, electron-hole pairs are generated in the graded quantum well structure of an optical modulator. In block 408, carriers are efficiently extracted from the graded quantum well structure.

This disclosure describes the invention in detail using illustrative embodiments. However, it is to be understood that the invention defined by the appended claims is not limited to the precise embodiments described.

We claim:

1. An optical modulator, comprising:
a first waveguide layer and a barrier layer; and
a quantum well layer sandwiched between the first waveguide layer and the barrier layer, where the quantum well layer has a graded composition that varies the bandgap energy of the quantum well layer between a minimum bandgap energy and the bandgap energy of at least one of the first waveguide layer and the barrier layer.

2. The optical modulator of claim 1, in which the material of the quantum well layer includes the same elements as the material of the first waveguide layer and the barrier layer.

3. The optical modulator of claim 2, in which the fraction of at least one element is graded across the quantum well layer, the fraction of the at least one element increasing toward the barrier layer, and a fraction of at least one other element is graded across the quantum well layer, the fraction of the at least one other element decreasing toward the barrier layer.

4. The optical modulator of claim 2, in which the fraction of at least one element is graded across the quantum well layer, the fraction of the at least one element decreasing toward the barrier layer, and a fraction of at least one other element is graded across the quantum well layer, the fraction of the at least one other element increasing toward the barrier layer.

5. The optical modulator of claim 2, in which the first waveguide layer comprises indium phosphide (InP) and the quantum well layer comprises indium gallium arsenide phosphide (InGaAsP).

6. The optical modulator of claim 5, in which the quantum well layer comprises indium gallium arsenide phosphide ($In_xGa_{1-x}As_yP_{1-y}$), where $0 \leq x \leq 1$ and $0 \leq y \leq 1$.

7. The optical modulator of claim 6, in which, when a reverse electrical bias is applied across the quantum well layer, the distribution of conduction-band electrons substantially aligns with the distribution of valence-band holes in the quantum well layer.

8. The optical modulator of claim 7, in which the quantum well layer has a progressive composition that ranges between $In_{0.61}Ga_{0.39}As_{0.84}P_{0.16}$ and $In_{0.85}Ga_{0.15}As_{0.33}P_{0.67}$.

9. The optical modulator of claim 1, wherein the quantum well layer further comprises:
a graded-composition layer and a fixed-composition layer, the graded-composition layer sandwiched between the first waveguide layer and the fixed-composition layer, the graded-composition layer having a bandgap energy between the bandgap energies of the first waveguide layer and the fixed-composition layer.

10. The optical modulator of claim 9, in which the material of the graded-composition layer includes the same elements as the material of the first waveguide layer and the fixed-composition layer.

11. The optical modulator of claim 10, in which the fraction of at least one element is graded across the graded-composition layer, the fraction of the at least one element increasing toward the barrier layer, and a fraction of at least one other element is graded across the graded-composition layer, the fraction of the at least one other element decreasing toward the barrier layer.

12. The optical modulator of claim 10, in which the fraction of at least one element is graded across the graded-composition layer, the fraction of the at least one element decreasing toward the barrier layer, and a fraction of at least one other element is graded across the graded-composition layer, the fraction of the at least one other element increasing toward the barrier layer.

13. The optical modulator of claim 10, in which the first waveguide layer, the barrier layer and the fixed-composition layer comprise indium phosphide (InP) and the graded-composition layer comprises indium gallium arsenide phosphide (InGaAsP).

14. The optical modulator of claim 13, in which the graded-composition layer comprises indium gallium arsenide phosphide ($In_xGa_{1-x}As_yP_{1-y}$), where $0 \leq x \leq 1$ and $0 \leq y \leq 1$.

15. The optical modulator of claim 14, in which, when a reverse electrical bias is applied across the quantum well layer, the distribution of conduction-band electrons substantially aligns with the distribution of valence-band holes in the quantum well layer.

16. The optical modulator of claim 15, in which the graded-composition layer has a progressive composition that ranges between $In_{0.70}Ga_{0.30}As_{0.70}P_{0.30}$ and $In_{0.85}Ga_{0.15}As_{0.33}P_{0.67}$.

17. The optical modulator of claim 15, in which the graded-composition layer varies the bandgap energy of the quantum well layer between the bandgap energy at the interface of the fixed-composition layer and the graded-composition layer and the bandgap energy of at least one of the first waveguide layer and the barrier layer.

18. A method of modulating light, comprising:
providing a quantum well structure having at least one element that forms a graded composition within the quantum well structure, the graded composition varying the bandgap energy of the quantum well structure;
directing light onto the quantum well structure;
converting the light into electron-hole pairs; and
extracting the electron-hole pairs from the quantum well to generate a photocurrent.

19. The method of claim 18, further comprising grading the composition of a quantum well layer in the quantum well structure to vary the bandgap energy of the quantum well layer between the bandgap energy of the layers adjoining the quantum well layer.

20. The method of claim 18, further comprising:
providing an additional material layer in the quantum well structure; and
grading the composition of the additional material layer to vary the bandgap energy of the additional material layer between the bandgap energy of the quantum well layer and a waveguide layer adjacent the additional material layer.

21. The method of claim 18, further comprising applying a reverse electrical bias across the quantum well structure so the distribution of conduction-band electrons substantially aligns with the distribution of valence-band holes in the quantum well structure.

22. An optical modulator, comprising:
a first waveguide layer and a barrier layer; and
a quantum well layer sandwiched between the first waveguide layer and the barrier layer, where the quantum well layer has a graded composition that varies the bandgap energy of the quantum well layer between a minimum bandgap energy and the bandgap energy of at least one of the first waveguide layer and the barrier layer with increasing distance from the first waveguide layer.

* * * * *